United States Patent
Schiffers et al.

(10) Patent No.: US 8,505,394 B2
(45) Date of Patent: Aug. 13, 2013

(54) STRAIN MEASUREMENT OF ROTATING COMPONENTS

(75) Inventors: Werner Schiffers, Ashby-de-la-Zouch (GB); John R. Webster, Derby (GB)

(73) Assignee: Rolls-Royce PLC, London (GB)

( * ) Notice: Subject to any disclaimer, the term of this patent is extended or adjusted under 35 U.S.C. 154(b) by 9 days.

(21) Appl. No.: 13/128,478

(22) PCT Filed: Oct. 28, 2009

(86) PCT No.: PCT/EP2009/007719
§ 371 (c)(1),
(2), (4) Date: May 10, 2011

(87) PCT Pub. No.: WO2010/060518
PCT Pub. Date: Jun. 3, 2010

(65) Prior Publication Data
US 2011/0219887 A1  Sep. 15, 2011

(30) Foreign Application Priority Data
Nov. 26, 2008 (GB) .................................. 0821588.1

(51) Int. Cl.
*G01L 5/10* (2006.01)
*G01L 1/10* (2006.01)
*G01H 17/00* (2006.01)

(52) U.S. Cl.
USPC .......... 73/862.41; 73/862.59; 73/650; 73/660

(58) Field of Classification Search
USPC ................... 73/597, 599, 602, 627, 649, 655, 73/658, 650, 660, 862.41, 862.59
See application file for complete search history.

(56) References Cited

U.S. PATENT DOCUMENTS

| 4,379,226 A * | 4/1983 | Sichling et al. ............. 250/231.1 |
| 4,481,825 A * | 11/1984 | Kljuev et al. .................... 73/655 |
| 4,502,340 A | 3/1985 | Gebben |
| 5,585,572 A * | 12/1996 | Kindler ..................... 73/862.338 |
| 6,415,666 B1 * | 7/2002 | Donskoy et al. ................. 73/627 |
| 6,492,933 B1 * | 12/2002 | McEwan .......................... 342/28 |
| 6,505,130 B1 * | 1/2003 | Springer et al. ................ 702/40 |
| 6,545,762 B2 * | 4/2003 | Lewis et al. .................... 356/502 |
| 7,073,384 B1 * | 7/2006 | Donskoy et al. ................. 73/657 |
| 7,302,852 B2 * | 12/2007 | Chien ............................. 73/643 |
| 2004/0017299 A1 * | 1/2004 | Campbell et al. ........ 340/870.01 |
| 2010/0319457 A1 * | 12/2010 | Tyren .............................. 73/649 |

FOREIGN PATENT DOCUMENTS

| GB | 2 185 106 A | 7/1987 |
| WO | WO 01/73389 A1 | 10/2001 |

OTHER PUBLICATIONS

Whitehead et al., "Torque sensor employing a mechanical resonator," Sensors and Actuators A 60, pp. 29-31, 1997.
"Vibstring TorqueSensor," http://vibstring.com/torpue.php, Mar. 3, 2009.
Search Report issued in GB0821588.1, dated Mar. 3, 2009.
International Search Report issued in PCT/EP2009/007719, mailed Jun. 21, 2010.
Written Opinion issued in PCT/EP2009/007719, mailed Jun. 21, 2010.

* cited by examiner

*Primary Examiner* — Lisa Caputo
*Assistant Examiner* — Jonathan Dunlap
(74) *Attorney, Agent, or Firm* — Oliff & Berridge, PLC

(57) ABSTRACT

A strain sensor apparatus for a rotatable shaft including a radiation emitter/receiver, a vibration element attached to the shaft and a radiation-reflective annulus surrounding the shaft and vibration element.

8 Claims, 4 Drawing Sheets

(a)

(b)

(c)  Zero (d)

(e)

(f)

(g)

(h)

STRAIN MEASUREMENT OF ROTATING COMPONENTS

BACKGROUND

The present invention relates to a method and apparatus associated with wireless flexural behaviour measurement and in particular, but not exclusively, steady and/or vibrational torque measurement of a shaft of a gas turbine engine for example.

Conventional wireless sensors find a wide range of applications in the area of instrumentation for example in engine development work, processing plants and medicine to name but a few. Wireless sensors have shown a clear potential in particular for vibration and rotational monitoring. When applied for instrumentation on development gas turbine engines, wireless sensors have a number of advantages such as the reduction of expensive wiring, the reduction of complexity, reduced set up time for monitoring and removal of connector faults.

One application of wireless sensors is the measurement of torque on a rotating shaft. The majority of torque sensors employ strain gauges and use slip rings, inductive or optical links to transfer data.

One such torque sensor apparatus 30 is shown on FIG. 1 and comprises an emitter/transceiver 32 directed to a shaft 34 having a metal wire 36 attached thereto. The metal wire is attached between two points on the shaft at an angle to its rotational axis 38. If no torque is applied common in-service vibrations in the shaft excite the string and make it vibrate at its resonance frequency $f_0$, determined by string's geometrical and material parameters. Application of a torque to the shaft alters the string tension, resulting in a corresponding change of the resonance frequency. The microwave transceiver 32, directed towards the sensing wire 44, emits an RF signal which is reflected at the wire 44. The amplitude of the return signal 54 is modulated due to the wire's vibrations. The change of amplitude is indicative of the torque applied to the shaft 34.

SUMMARY

However, this prior art torque sensor is disadvantaged in that the signal is only recorded once every shaft revolution and therefore only a snap-shot of the behaviour of the shaft is ever seen. This method also limits the amount of signal received and hence the average signal strength is particularly weak.

Therefore it is an object of the present invention to provide new torque sensor apparatus and method of measuring torque which obviates the above mentioned problems.

In accordance with the present invention there is provided a strain sensor apparatus for a rotatable shaft comprising a radiation emitter/receiver, a vibration element attached to the shaft and a radiation-reflective annulus surrounding the shaft and vibration element.

Preferably, a waveguide extends between the emitter/transceiver and an aperture defined in the annulus.

Preferably, the emitter/transceiver is positioned radially inwardly of the annulus.

Alternatively, two vibration elements are positioned to reflect radiation from one to the other.

Preferably, the two vibration elements are spaced apart and angled at approximately 90 degrees to one another.

Alternatively, a reflector is positioned to reflect radiation onto the vibration element.

Preferably, the reflector is concave and positioned to reflect radiation onto a part of the vibrational element having the greatest amplitude.

BRIEF DESCRIPTION OF THE DRAWINGS

Preferably, the vibration element is a wire.

The present invention will be more fully described by way of example with reference to the accompanying drawings in which.

DETAILED DESCRIPTION

Figure 2:
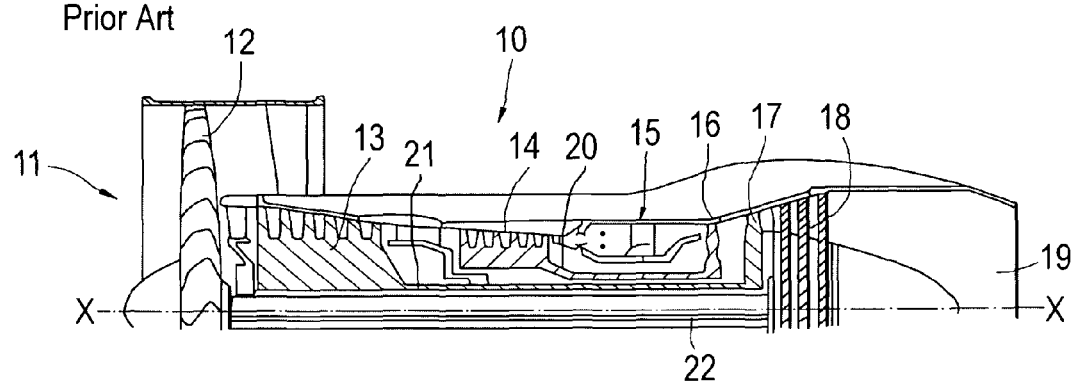
FIG. 2 is a schematic section of a prior art three-shaft ducted fan gas turbine engine.

With reference to FIG. 2, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19.

The gas turbine engine 10 works in a conventional manner so that air entering the intake 11 is accelerated by the fan 12 to produce two air flows: a first air flow into the intermediate pressure compressor 14 and a second air flow which passes through a bypass duct (not shown) to provide propulsive thrust. The intermediate pressure compressor 13 compresses the air flow directed into it before delivering that air to the high pressure compressor 14 where further compression takes place. The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by interconnecting shafts 20, 21, 22 respectively thereby making up high, intermediate and low-pressure spools.

Figure 3:
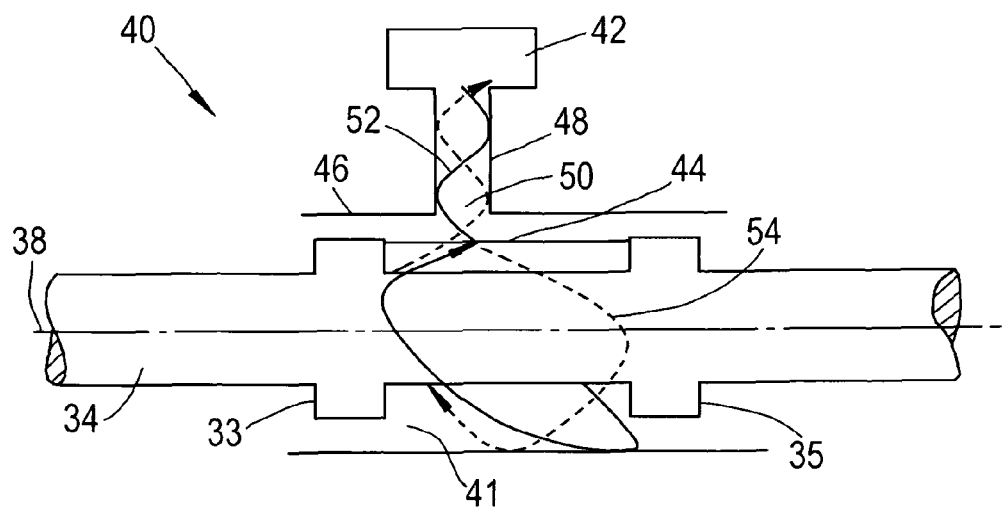
FIG. 3 is a schematic side view of strain sensor apparatus applied to a shaft in accordance with the present invention.
Figure 5A:
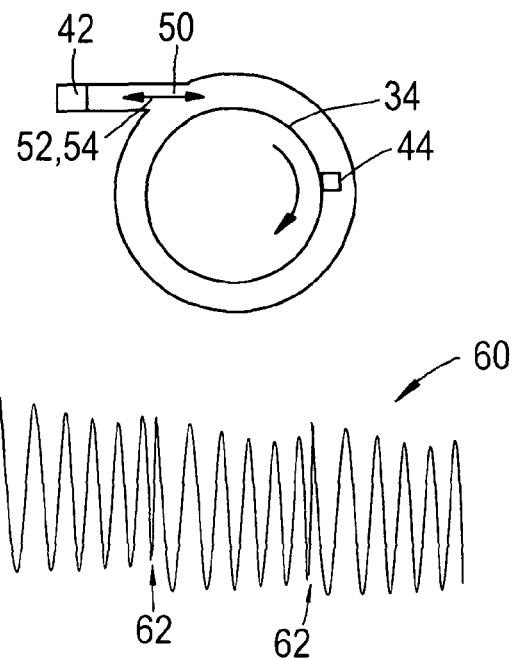
FIG. 5a is a view of a further embodiment of the strain sensor apparatus in accordance with the present invention.

Referring to FIGS. 3 and 5a, a novel strain sensor apparatus 40 comprises an emitter/transceiver 42 directed to a vibration element 44, in this example a metal wire, attached to a shaft 34, for example between two flanges 33, 35. A radiation-reflective annulus 46 surrounds the shaft radially outwardly of the vibration element 44. A waveguide 48, itself radiation-reflective, extends between the emitter/transceiver 42 and an aperture 50 defined in the annulus 46.

The emitter/transceiver 42 emits microwave radiation (solid line 52), which is channeled through the waveguide 48, through the aperture 50 and into the generally annular space 41 between the shaft 34 and annulus 46. Both the shaft 34 and importantly the annulus 46 are substantially impermeable to (microwave) radiation, such that their surfaces reflect the radiation. The microwave radiation output 52 is then guided between the rotating shaft 34 and the annulus 46 and impinges on the vibrational wire 44. The radiation reflected by the vibrational element, or return signal, is shown as a dashed line 54. Thus, while the shaft 34 is rotating, the vibrating element 44 will be able to 'see' the microwave radiation constantly rather than at a once per revolution interval of the prior art arrangement. This novel torque sensor apparatus 40, therefore results in a higher average signal level being detected, which in turn gives a much improved quantity and quality data.

A further advantage of the invention is the continuous visibility of the return signal, rather than a once-per-revolution 'snap-shot' event of the prior art which enables detection of behavioural defects such a flutter. In other words vibrational characteristics that occur within a single revolution of the shaft are not capable of being detected by the prior art arrangement and indeed its results may be effected by unexplainable or not-apparent phenomena. As will be described later this is not the case with the arrangement of the present invention.

Instead of using a single suspended vibrational wire on the shaft 34 it is known to use two vibrational wires arranged typically perpendicular to one another and crossing at their centre-points. This is simply to give two readings for the change of torsional displacement in the shaft. This arrangement substantially removed temperature and bending effects by taking the difference of the two wire's frequencies. One string will undergo increased strain, the other decreased. Radiation reflected directly from each wire is independently recorded to give two strain components.

Figure 4:
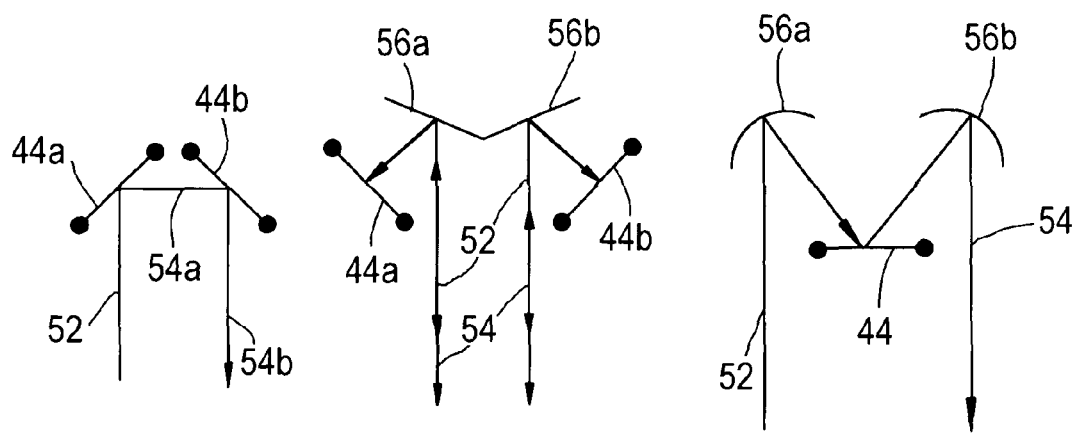
FIG. 4a-c is a schematic layout of embodiments of strain sensor apparatus in accordance with the present invention.

Referring to FIG. 4, a further improvement of this novel torque sensor apparatus 40 comprises two vibration elements 44a, 44b angled, at preferably 90°, to one another. However, in FIG. 4a they are displaced from one another and reflect the radiation from one vibration element to the other, which generates a stronger return signal than a single wire.

The prior art two-wire arrangement primarily accounts for measuring shaft torque at the optimum configuration, i.e. 45°, and effectively use the two-wire arrangement only to compare positive and negative torque changes on a particular position on the shaft. The arrangement of the wires 44a, 44b of the present invention, in FIG. 4a, means that radiation is directed from one wire to the centre of the other wire where the amplitude and therefore transmitted signal is greatest. Once the radiation is reflected off string 44a it begins to lose some energy but impinging on wire 44b centrally the return signal is greatly enhanced for maximum signal strength.

In another embodiment shown in FIG. 4b, the torque sensor apparatus 40 comprises two reflectors 56a, 56b at approximately 135° to one another with the vibration elements 44a, 44b opposite the reflectors at 45° to the shaft axis in order to achieve optimum signal conditions. Note that the incoming and returning radiation paths 52, 54 are along the same lines. FIG. 4b is an improvement compared to FIG. 4a because the radiation is reflected off reflector 56a or 56b respectively onto string 44a or 44b respectively. The energy loss after reflection will be less compared to the previous configuration as the reflectors are rigid.

In the embodiment shown in FIG. 4c, two reflectors 56a, 56b are arranged at approximately 90° and are adjacent a single vibration element 44. One reflector 56a directs the microwaves towards the vibration element and the other reflector 56b directs the reflected signal from the vibration element back to the detector 42. This again is to achieve a stronger signal at the detector because the reflector 56a is capable of focussing emitted radiation 52 onto the vibration element. The third improvement is described with reference to FIG. 4c where a parabolic reflector concentrates the radiation onto the centre of a string and the reflections will be directed back to the receiver. The parabolic reflector enables maximum radiation transfer. The above description is good for string geometries, however this provides an even greater effect to the proposed plate 60 of FIG. 5. In particular configuration of FIG. 4c with parabolic reflectors will be able to direct the radiation onto the centre point of the plate.

In the embodiment described with reference to FIG. 4b, the reflectors 56a, 56b may be either planar in shape or may be a concave shape. In particular, the concave shape enables radiation to be focussed onto the centre of the vibration element 44 where its amplitude is greatest and therefore its reflection response is further improved.

Figure 1:
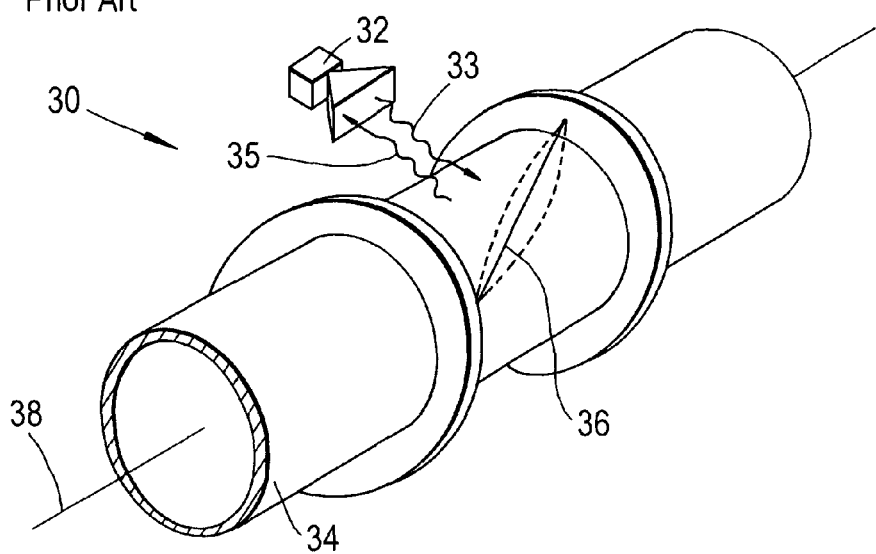
FIG. 1 is a schematic view of a prior art torque sensor apparatus applied to a shaft.

To describe the signal processing of the present invention and its advantages, reference is first made to the prior art of FIG. 1. The signal 35 returned from vibrating element 36 to the microwave receiver 32 is in the form of a burst of microwave energy typically in the order of GHz. This is processed by amplitude or frequency demodulation to provide a signal or data as a measure of the wire vibration frequency, which is in the form of an interrupted sine wave. Under steady conditions (i.e. no vibration), the sine wave is a constant frequency. If torsional or flexural vibration of the shaft occurs (i.e. unsteady conditions) the frequency of the received signal will also vary during one revolution of the shaft 34. With typical shaft rotational frequencies in excess of 5 kHz, the opportunity exists to extract further data to yield temporal resolution of strain within one shaft revolution.

Figure 5B:
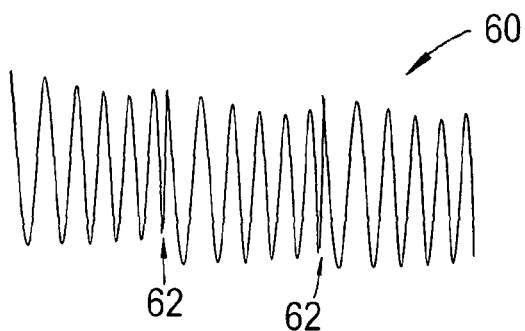
FIG. 5b-c comprises signal processing steps strain sensor apparatus in accordance with the present invention.
Figure 5C:
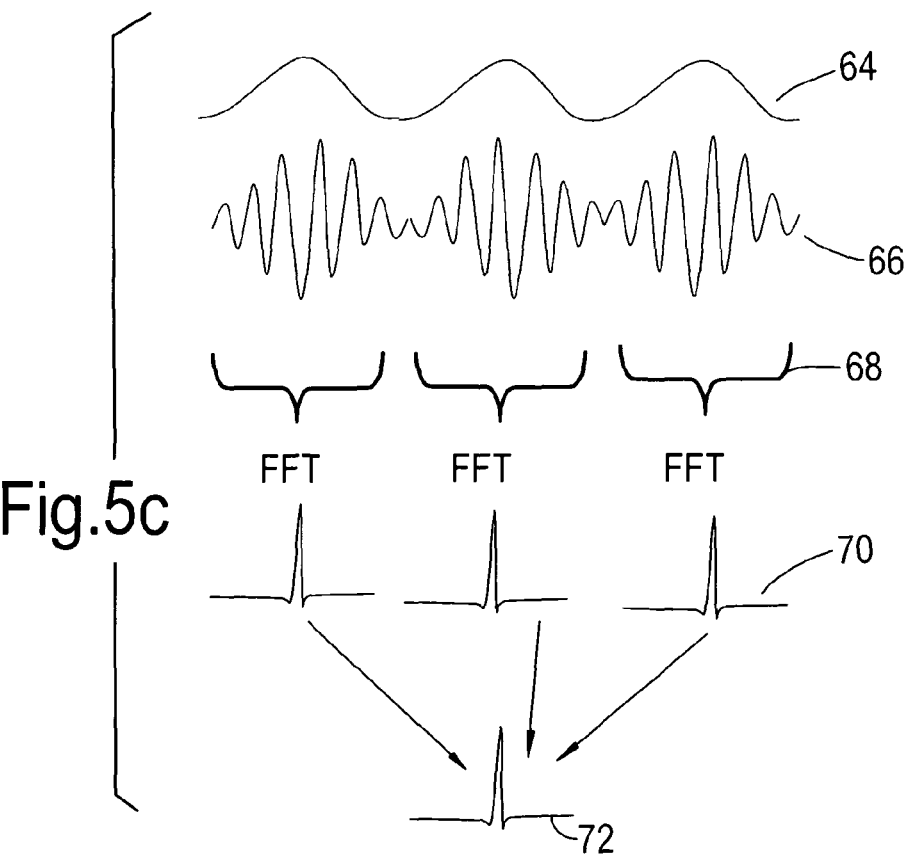

Referring now to the signal processing of the present invention shown in FIGS. 5a-c, during steady conditions and a steady strain on the wire, the wire will vibrate at a constant frequency. The received microwave signal (at Ghz frequency) will be modulated at the wire vibration frequency of about 5 kHz. A standard demodulation method (either FM or AM) will then provide a signal (FIG. 5b), approximating to a sine wave, which represents the vibration of the wire plus any Doppler shift due to the rotation of the shaft 34. Note that when two wires are used, the torque relates to the difference in frequency, so any Doppler shift will cancel out. However, there is a phase discontinuity 62 each time the vibrating element 44 passes the opening 50 to the microwave transceiver 42. It is known to remove such discontinuities by the use of a 'window function' such as the Hanning, Hamming or many other well known types. A problem may occur in application to the present invention; the use of a non-synchronised frequency measurement such as a Fast-Fourier Transformation (FFT) should not be used because if applied at random to the signal the result could be a significant loss or even a complete cancellation of the signal if averaging over several shaft revolutions.

In order to obviate this problem, the received signal is multiplied by a shaped processing 'window' 64 as shown in FIG. 5c. The window 64 is synchronised to the signal by triggering it from a once-per-revolution indicator associated with the shaft 34 or by recognising the step phase change 62 in the signal 54.

The signal 54 multiplied by the window function 64 gives an output/strain 66. The frequency of the output signal 66 is indicative of the strain in the rotating shaft and gives a major improvement in strain/torque measurement over a simple 'line of sight' method as described in the prior art on pages 2 and 3.

During unsteady conditions, as discussed previously, the strain signal 66 can vary considerably over a single revolution of the shaft. This may occur due to torsional or flexural vibrations, both of which are significant in a rotating machine. This variation typically approximates to a sinusoidal change in strain. Under these conditions, a shorter Hanning window is required, with several windows used over one revolution, followed by frequency measurement, such as FFT 68. In practice, multiple frequencies may be received due to multiple shaft resonances and these are separated by the FFTs. In order to improve signal integrity, a once-per-revolution shaft indicator can be used. FFTs signals 70 within one revolution can be averaged in amplitude and phase to give a frequency 72, relating to the peak strain and a phase relative to the shaft revolution that gives the position of maximum excursion of the vibration relative to the shaft's rotational position. This increase of amplitude and noise rejection is achieved by again averaging the amplitude of the FFTs signal 70 only over different shaft revolutions.

Figure 6:
FIG. 6a-h comprises signal processing steps strain sensor apparatus in accordance with the present invention.
Figure 6:
Figure 6:
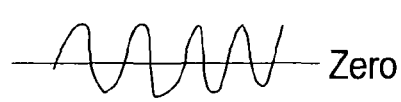
Figure 6:
Figure 6:
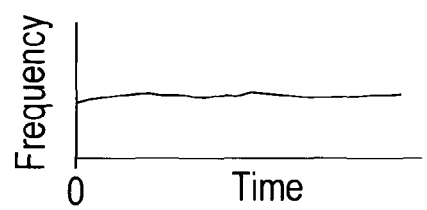
Figure 6:
Figure 6:
Figure 6:

An alternative frequency determining method is to use a 'zero crossing' approach. With the zero crossing approach, as before, the microwave signal (FIG. 6a) is demodulated to provide a signal which represents the wire vibration (FIG. 6b) additional band pass filtering around the expected wire vibration frequency may also be applied (FIG. 6c). Each time the signal crosses zero (or some other convenient level) a crossing is registered (FIG. 6d). The rate of this zero crossing (FIG. 6e) represents the wire tension and hence torque.

When a varying torque is present, the derived wire signal (FIG. 6f), will vary in response to this torque. The corresponding zero crossing (FIG. 6g) and rate (FIG. 6h) also show the torque variations. The zero crossing method is potentially much simpler to implement and so is much lower cost. It requires less sophisticated electronics and can be more noise tolerant, so is a more robust solution.

In a case where frequency modulation of the microwave signal occurs, the step of demodulation (FIGS. 6a to 6b) can be omitted and zero crossing applied directly to the raw microwave signal.

The invention claimed is:

1. A strain sensor apparatus for a rotatable shaft, the strain sensor apparatus comprising:
   a radiation emitter/transceiver;
   a vibration element attached to the shaft, a direct line-of-sight between the emitter/transceiver and the vibration element being interrupted by a rotation of the shaft; and
   a radiation-reflective annulus, wherein
      the radiation-reflective annulus surrounds the shaft and vibration element, and
      radiation emitted by the emitter/transceiver is guided between the shaft and annulus and continuously impinges on the vibration element.

2. A strain sensor apparatus as claimed in claim 1 wherein a waveguide extends between the emitter/transceiver and an aperture defined in the annulus.

3. A strain sensor apparatus as claimed in claim 1 wherein the emitter/transceiver is positioned radially inwardly of the annulus.

4. A strain sensor apparatus as claimed in claim 1 wherein two vibration elements are positioned to reflect radiation from one to the other.

5. A strain sensor apparatus as claimed in claim 4 wherein the two vibration elements are spaced apart and angled at approximately 90 degrees to one another.

6. A strain sensor apparatus as claimed in claim 1 wherein a reflector is positioned to reflect radiation onto the vibration element.

7. A strain sensor apparatus as claimed in claim 6 wherein the reflector is concave and positioned to reflect radiation onto a part of the vibrational element having the greatest amplitude.

8. A strain sensor apparatus as claimed in claim 1 wherein the vibration element is a wire.

* * * * *